United States Patent
Nakamura et al.

(10) Patent No.: US 9,543,880 B2
(45) Date of Patent: *Jan. 10, 2017

(54) ROTARY MACHINE CONTROL APPARATUS

(71) Applicant: DENSO CORPORATION, Kariya, Aichi-pref. (JP)

(72) Inventors: Kouichi Nakamura, Obu (JP); Takashi Suzuki, Kariya (JP); Yoshitaka Hayashi, Obu (JP)

(73) Assignee: DENSO CORPORATION, Kariya, Aichi-pref.

( * ) Notice: Subject to any disclaimer, the term of this patent is extended or adjusted under 35 U.S.C. 154(b) by 0 days.

This patent is subject to a terminal disclaimer.

(21) Appl. No.: 14/793,390

(22) Filed: Jul. 7, 2015

(65) Prior Publication Data
US 2016/0006387 A1 Jan. 7, 2016

(30) Foreign Application Priority Data
Jul. 7, 2014 (JP) .................... 2014-139698

(51) Int. Cl.
*H02P 25/22* (2006.01)
*H02P 6/12* (2006.01)
*B62D 5/04* (2006.01)

(52) U.S. Cl.
CPC ............. *H02P 25/22* (2013.01); *B62D 5/0463* (2013.01); *B62D 5/0484* (2013.01); *B62D 5/0487* (2013.01); *H02P 6/12* (2013.01); *H02P 29/0241* (2016.02); *H02P 29/032* (2016.02)

(58) Field of Classification Search
CPC ........... H02P 25/22; H02P 6/12; H02P 29/032; H02P 29/0241; B62D 5/0487; B62D 5/0463; B62D 5/0484

USPC ........................................................ 701/43
See application file for complete search history.

(56) References Cited

U.S. PATENT DOCUMENTS

| 6,158,553 A | 12/2000 | Oshima et al. |
| 6,360,153 B1 | 3/2002 | Shunmura et al. |
| 8,421,385 B2 * | 4/2013 | Bohm ............... B62D 5/008 318/363 |

(Continued)

FOREIGN PATENT DOCUMENTS

| JP | H11-286278 A | 10/1999 |
| JP | 2001-71791 A | 3/2001 |

(Continued)

*Primary Examiner* — Brian P Sweeney
(74) *Attorney, Agent, or Firm* — Knobbe, Martens, Olson & Bear, LLP

(57) ABSTRACT

A rotary machine control apparatus controlling a drive of a rotary machine that has multiple winding groups is provided. The rotary machine control apparatus includes electric power converters in multiple systems, a failure detection portion, and a control portion. An electric power converter has switching elements in an upper arm and a lower arm and converts DC power. The failure detection portion detects a failure of an electric power converter or a winding group. The control portion calculates a current command value and a maximum current limit value, and controls an output to the electric power converter. The control portion stops the output to the electric power converter in a failure system, and the control portion increases the maximum current limit value with respect to the output to an electric power converter in a normal system.

17 Claims, 10 Drawing Sheets

(56) References Cited

U.S. PATENT DOCUMENTS

| | | | |
|---|---|---|---|
| 8,960,363 B2* | 2/2015 | Morishita | B62D 5/0463 |
| | | | 180/446 |
| 2007/0093359 A1 | 4/2007 | Kobayashi et al. | |
| 2009/0251831 A1* | 10/2009 | Shiba | B60L 3/003 |
| | | | 361/30 |
| 2011/0074323 A1 | 3/2011 | Mukai | |
| 2011/0074333 A1 | 3/2011 | Suzuki | |
| 2012/0273290 A1 | 11/2012 | Kawano et al. | |
| 2013/0033210 A1 | 2/2013 | Suzuki et al. | |
| 2013/0179039 A1 | 7/2013 | Uryu | |
| 2013/0249454 A1* | 9/2013 | Mori | H02P 6/16 |
| | | | 318/400.09 |
| 2014/0009093 A1* | 1/2014 | Suzuki | H02P 21/0096 |
| | | | 318/400.02 |
| 2016/0043670 A1* | 2/2016 | Nakamura | H02P 6/002 |
| | | | 318/400.17 |

FOREIGN PATENT DOCUMENTS

| | | |
|---|---|---|
| JP | 2005-112162 A | 4/2005 |
| JP | 2010155592 | 7/2010 |
| JP | 2013048524 | 3/2013 |
| JP | 2013-141869 A | 7/2013 |

\* cited by examiner

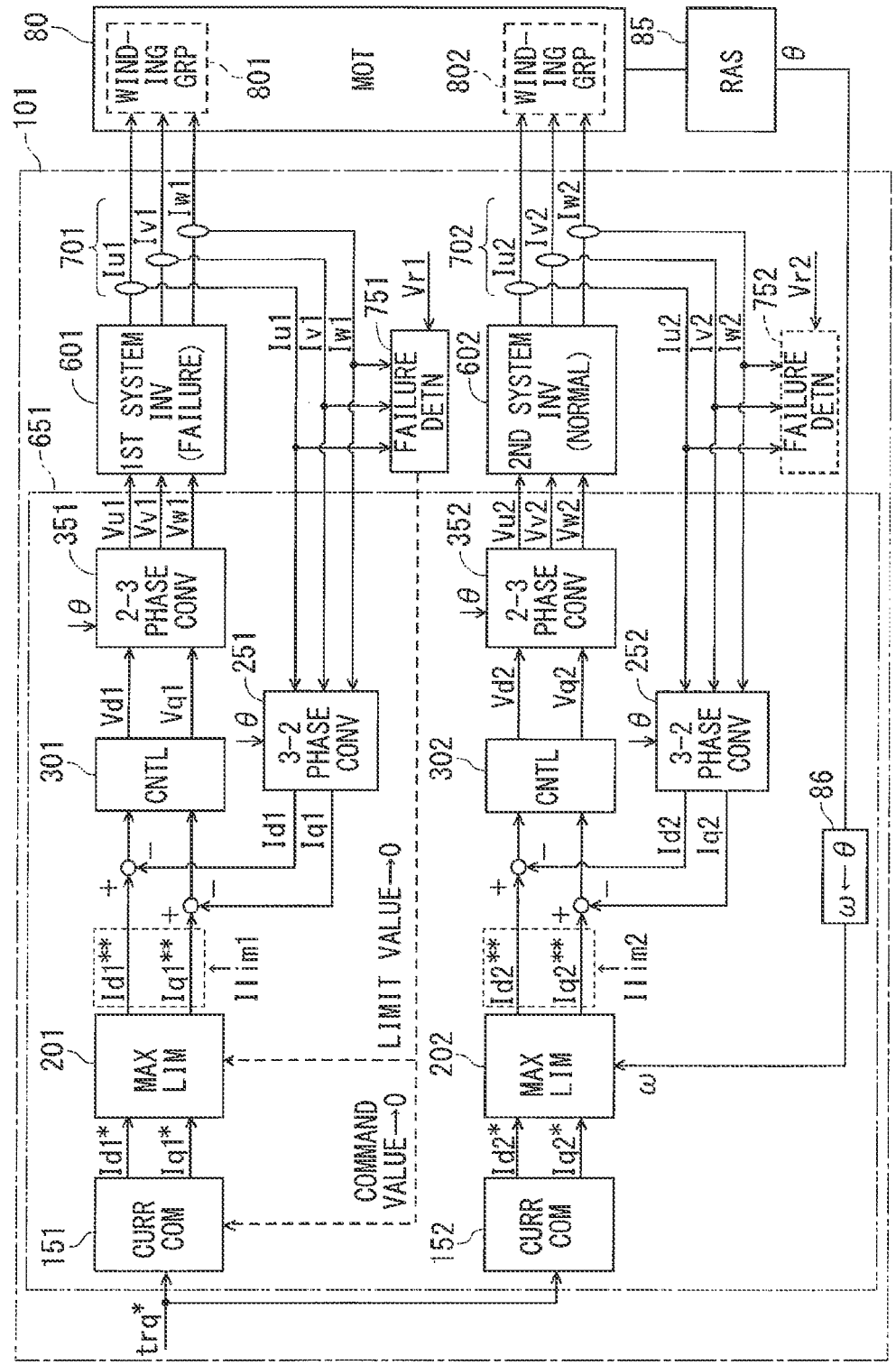

ROTARY MACHINE CONTROL APPARATUS

CROSS REFERENCE TO RELATED APPLICATION

This application is based on Japanese Patent Application No. 2014-139698 filed on Jul. 7, 2014, the disclosure of which is incorporated herein by reference.

TECHNICAL FIELD

The present disclosure relates to a control apparatus controlling a driving of a rotary machine.

BACKGROUND

Patent literature 1: JP 2013-048524 A

Conventionally, a control apparatus of a rotary machine is known. The control apparatus includes electric power converters in multiple systems and controls energization to corresponding multiple winding groups. When either of the systems gets out of order, the control apparatus drives the rotary machine only with an electric power converter and a winding group in a normal system is known.

For example, a control apparatus for a multiple-phase rotary machine described in patent literature 1 controls an output of electric power converter when a short circuit failure occurs in an electric power converter or a winding group in either one of two systems. In this case, the control apparatus in patent literature 1 stops an output to an electric power converter of a failure system and sets an output limit value of the output to an electric power converter of a normal system smaller as the rotation number of the rotary machine is greater. The processing is performed in order to prevent the electric power converter and the winding wire in the failure system from excessively generating heat due to a counter electromotive voltage generated in the failure system accompanied with a rotation of the rotary machine.

The inventors of the present disclosure have found the following.

When a shirt circuit failure occurs in one of systems, a braking torque against a driving may generate in the rotary machine due to the counter electromotive voltage, which is generated in the failure system accompanied with the rotation of the rotary machine. Thus, at the time of the driving only with the normal system, so that the rotary machine outputs a required torque similar to a normal driving condition, it may be necessary to send current to the electronic power converter in the normal system greater than the normal driving condition for compensating the lowering of the torque by the braking torque. Incidentally, the normal driving condition is a condition where the two systems function normally.

Patent literature 1 may focus on a prevention of heat generation in the failure system.

SUMMARY

It is an object of the present disclosure to provide a rotary machine control apparatus controlling a drive of a rotary machine with multiple winding groups and including electric power converters in multiple systems. The control apparatus causes a rotary machine to output torque for compensating breaking torque only with a drive of a normal system when a short circuit failure occurs in an electric power converter or a winding group in either of the systems.

According to one aspect of the present disclosure, a rotary machine control apparatus controlling a drive of a rotary machine that has a plurality of winding groups is provided. The rotary machine control apparatus includes electric power converters in a plurality of systems, a failure detection portion, and a control portion. Each of the electric power converters has a switching element in an upper arm and a switching element in a lower arm and converts DC power to supply to a corresponding winding group corresponding to an electric power converter. The switching element in the upper arm is bridge connected to the switching element in the lower arm. The failure detection portion detects a failure of an electric power converter or a winding group. The control portion calculates a current command value, which instructs current sent to each of the winding groups in the rotary machine and a maximum current limit value to the current command value, and controls an output to each of the electric power converters for each of the systems. The partial system short circuit failure corresponds to a case where any portion between wirings in the electric power converters or the winding groups in either of the systems is in a conductive state against a control indicating a non-conductive state. When the failure detection portion detects the partial system short circuit failure in the electric power converter or the winding group in either of the systems, the control portion stops the output to the electric power converter in a failure system, and the control portion increases the maximum current limit value as a rotation angular velocity of the rotary machine is larger with respect to the output to an electric power converter in a normal system.

According to another aspect of the present disclosure, a rotary machine control apparatus applied to a vehicular electric power steering apparatus and controlling a drive of a motor assisting a steering torque is provided. The motor has a plurality of winding groups. The rotary machine control apparatus includes electric power converters in a plurality of systems, a failure detection portion, and a control portion. Each of the electric power converters has a switching element in an upper arm and a switching element in a lower arm, and converts DC power to supply to a corresponding winding group corresponding to an electric power converter. The switching element in the upper arm is bridge connected to the switching element in the lower arm. The failure detection portion detects a failure of an electric power converter or a winding group. The control portion calculates a current command value, which instructs current sent to each of the winding groups in the motor and a maximum current limit value to the current command value, and controls an output to each of the electric power converter for each of the systems. The partial system short circuit failure corresponds to a case where any portion between wirings in the electric power converters or the winding groups in either of the systems is in a conductive state against a control indicating a non-conductive state. When the failure detection portion detects the partial system short circuit failure in the electric power converter or the winding group in either of the systems, the control portion stops the output to the electric power converter in a failure system, and the control portion increases the maximum current limit value as variation amount of the steering torque is larger with respect to the output to the electric power converter in a normal system According to the rotary machine control apparatus, a rotary machine control apparatus controlling a drive of a rotary machine with multiple winding groups and electric power converters in multiple systems. The control apparatus causes the rotary machine to output torque for compensating breaking torque only with a drive in a normal system when a short circuit failure occurs in an electric power converter or a winding group in either of the systems.

BRIEF DESCRIPTION OF THE DRAWINGS

The above and other objects, features and advantages of the present disclosure will become more apparent from the following detailed description made with reference to the accompanying drawings. In the drawings:

FIG. 3 is a block diagram illustrating the EPS motor control apparatus in a first embodiment;

DETAILED DESCRIPTION

Figure 1:
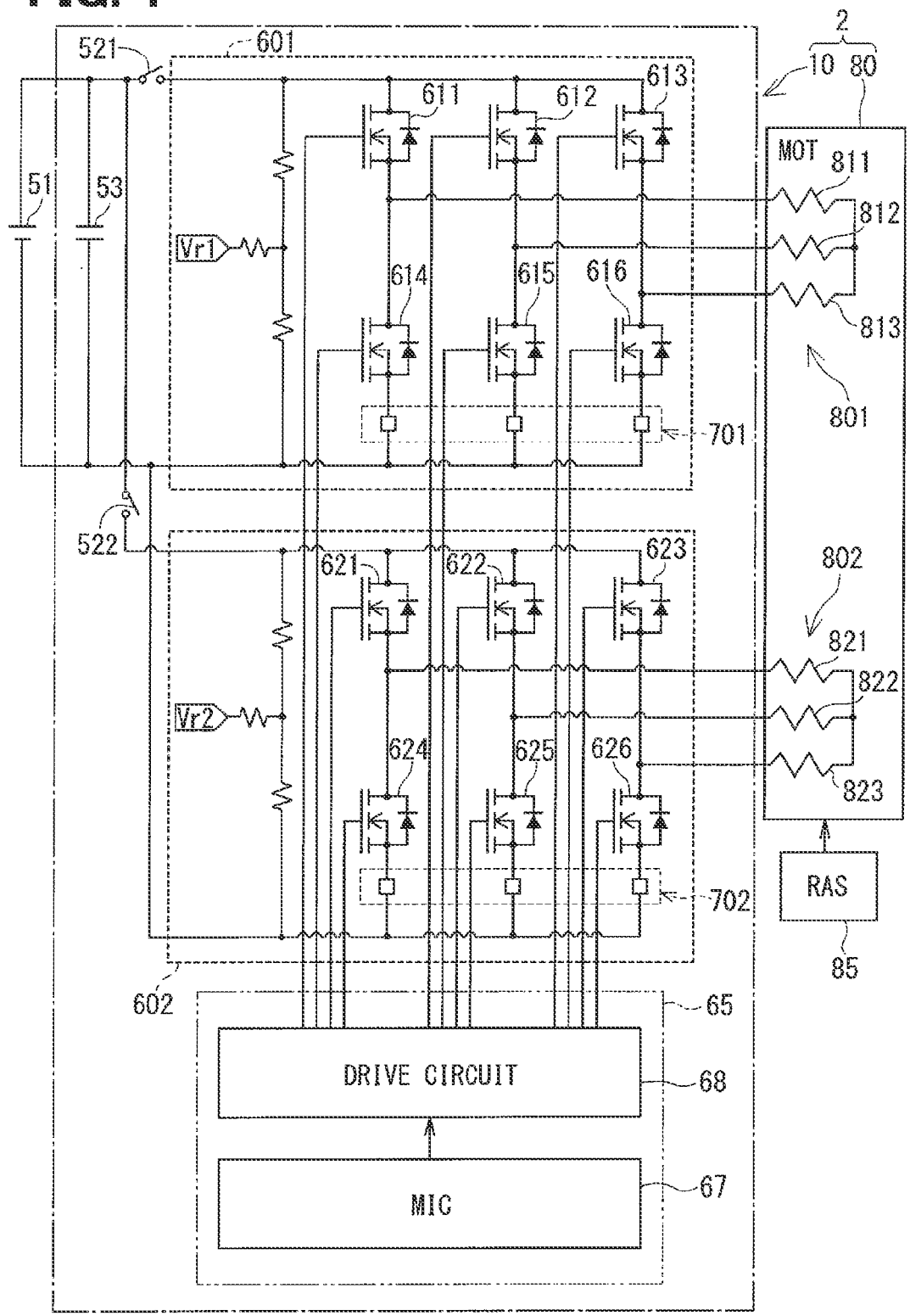
FIG. 1 is a diagram schematically illustrating a circuit of inverters of two systems that are controlled by an EPS motor control apparatus in each embodiment.

Embodiment of the present disclosure will be explained with referring to the drawings. In the present embodiments, a control apparatus of a rotary machine in the present disclosure is applied to an electric power steering (EPS) apparatus of a vehicle as an example.

Configurations common to each embodiment will be explained with referring to FIG. 1 and FIG. 2.

Common Configuration

Figure 2:
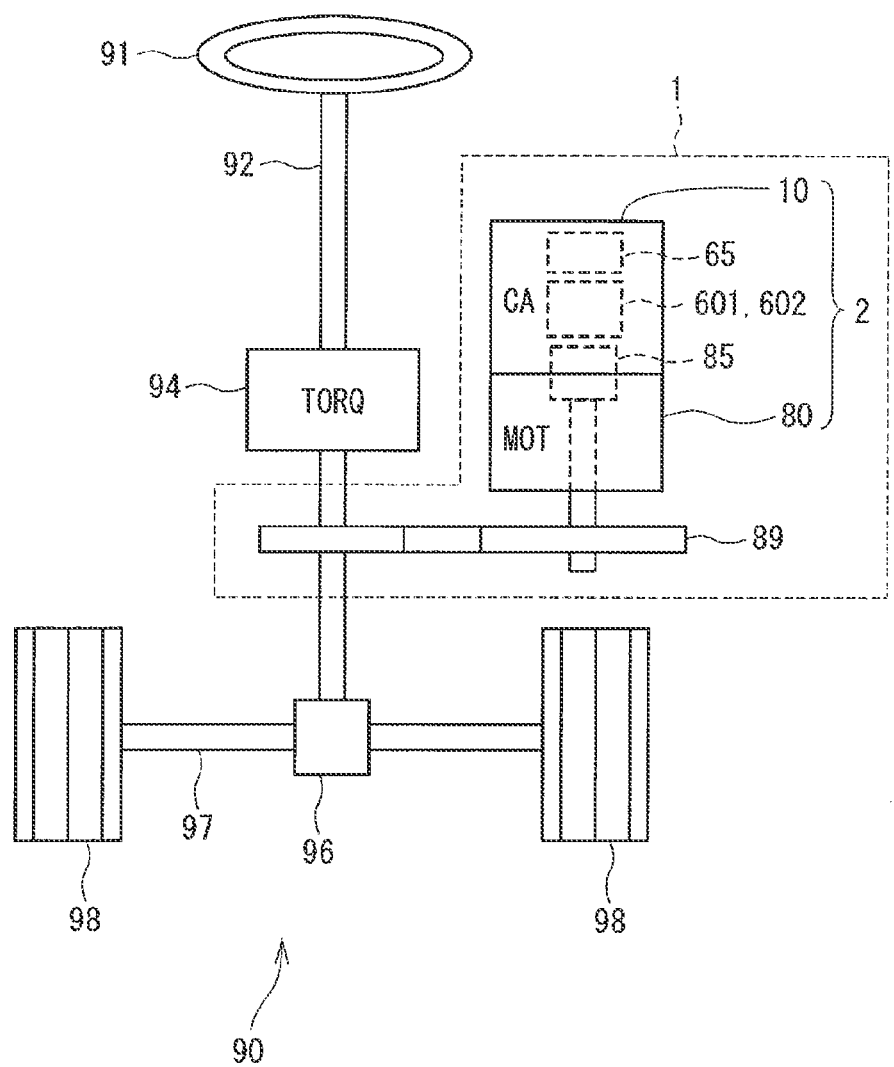
FIG. 2 is a diagram schematically illustrating an electric power steering apparatus that the EPS motor control apparatus is applied to in each embodiment.

FIG. 2 illustrates a whole configuration of a steering system 90 including an electric power steering apparatus 1. A steering shaft 92 is connected to a steering wheel 91. The steering shaft 92 has a torque sensor 94 for detecting a steering torque. The steering shaft 92 includes a pinion gear 96 at the head of the steering shaft 92. The pinion gear 96 engages a rack shaft 97. At the both ends of the rack shaft 97, a pair of wheels 98 is rotatably connected with the rack shaft 97 through a tie rod or the like. A rotation motion of the steering shaft 92 is changed to a linear motion of the rack shaft 97 by the pinion gear 96, so that the pair of the wheel 98 is steered by an angle according to a displacement of the linear motion of the rack shaft 97.

The electric power steering apparatus 1 includes an actuator 2 and a reduction gear 89. The actuator 2 rotates a rotation shaft. The reduction gear 89 reduces a speed of a rotation of the rotation shaft and transmits to the steering shaft 92.

The actuator 2 includes an EPS motor 80 and an EPS motor control apparatus 10. The EPS motor 80 corresponds to a rotary machine that generates a steering assist torque. The EPS motor 80 may also be referred to as a motor. The EPS motor control apparatus 10 corresponds to a rotary machine control apparatus that drives the EPS motor 80. The EPS motor control apparatus 10 may be referred to as a motor control apparatus other than a fourth embodiment. The motor 80 in the present embodiment corresponds to a three-phase alternate current (AC) brushless motor. The motor 80 rotates the reduction gear 89 in forward and backward directions.

The motor control apparatus 10 includes a control portion 65 and inverters 601, 602. The inverters 601, 602 correspond to an electric power converter that controls electric supply to the motor 80 according to a command from the control portion 65.

The rotation angle sensor 85 includes, for example, a magnet corresponding to a magnetism generation portion provided to a side of the motor 80 and a magnetism detection element provided to a side of the motor control apparatus 10. The rotation angle sensor 85 detects a rotor rotation angle θ of the motor 80.

The control portion 65 controls switching of the inverters 601, 602 based on a torque command trq*, a rotation angle signal from the rotation angle sensor 85, a feedback current or the like, so that the control portion 65 controls energization of the motor 80. Accordingly, the actuator 2 in the electric power steering apparatus 1 generates a steering assist torque for supporting a steering of the steering wheel and transmits the steering assist torque to the steering shaft 92.

More detail, as described in FIG. 1, the motor 80 includes two pairs of winding groups 801, 802. The first winding group 801 includes three-phase winding wires 811-813 of a U phase, a V phase, and a W phase. The second winding group 802 includes three-phase winding wires 821-823 of a U phase, a V phase, and a W phase. The inverter 601 is provided corresponding to the first winding group 801. The inverter 602 is provided corresponding to the second winding group 802. Hereinafter, a unit of a combination of an inverter and a three-phase winding group corresponding to the inverter is referred to as a system. Incidentally, in multiple systems, electric characteristic in each of the systems is equal to each other. A symbol in a first system includes "1" and a symbol in a second system includes "2" regarding a symbol in a configuration element and physical quantity in each system.

The motor control apparatus 10 includes power source relays 521, 522, a capacitor 53, inverters 601, 602, current sensors 701, 702, a control portion 65, or the like.

The power source relays 521, 522 enables to cut off power supply from a battery 51 to the inverters 601, 602 in each system.

The capacitor 53 is connected to the battery 51 in parallel and stores electric charge. The capacitor 53 may support the power supply to the inverters 601, 602, and suppress a noise component such as surge current.

In the first system inverter 601, in order to change energization to each of the winding wires 811-813 in the first winding group 801, six switching elements 611-616 are bridge connected. The switching elements 611-616 in the present embodiment is MOSFET (metal oxide semiconductor field effect transistor). Hereinafter, the switching elements 611-616 may be referred to as MOSs 611-616.

Drains of the MOSs 611-613 in an upper arm, which corresponds to a high potential side, are connected to a positive electrode side of the battery 51. Sources of the MOSs 611-613 in the upper arm are connected to drains of the MOSs 614-616 in a lower arm, which corresponds to a low potential side. Sources of the MOSs 614-616 in the lower arm are connected to a negative electrode side of the battery 51. A connection point between the MOSs 611-613 in the upper arm and the MOSs 614-616 in the lower arm is connected to one end of the winding wires 811-813, respectively.

The current sensor 701 detects phase current electrified to the winding group 801 from the inverter 601. Although the current sensor 701 detects each current in three phases in FIG. 1, a current sensor may detect current in two phases and calculate current in the other phase using Kirchhoff's law in another example.

Input voltage Vr1 is detected by a predetermined divided voltage between a power source line and a ground line in the first system inverter 601.

Regarding a second system inverter 602, a configuration of switching elements (MOS) 621-626 and a current sensor 702, and a configuration for detecting input voltage Vr2 are similar to the configurations of the first system inverter 601.

The control portion 65 includes a microcomputer 67, a drive circuit 68, or the like. The drive circuit 68 corresponds to a predriver. The microcomputer 67 performs a control calculation of each calculation value for control based on input signal of a torque signal, a rotation angular signal, or the like. The drive circuit 68 is connected to gates of the MOSs 611-616, 621-626, and performs a switching output based on the control of the microcomputer 67.

When one of the two systems gets out of order, the control portion 65 in the present embodiment stops an output to an inverter in a failure system and executes a control with respect to an output to an inverter in a normal system. The control of the output to the inverter in the normal system will be explained.

Configuration of the Control Portion

It is supposed that one system of the inverters 601, 602 or the winding groups 801, 802 of the two systems gets out of order. In this condition, a configuration of the control portion 65 for maintaining an output torque of the motor 80 only with a drive of the normal system will be explained. Processing performed by the control portion 65 will also be explained. Hereinafter, the motor control apparatus 10 will be referred to as a motor control apparatus 101-103 in respective embodiments. The control portion 65 will be referred to as a control portion 651-653 in respective embodiments. That is, in the first embodiment, the motor control apparatus 10 will be referred to as the motor control apparatus 101, and the control portion 65 will be referred to as the control portion 651, for example. A configuration similar in each embodiment will be given the identical symbol, and an explanation will be omitted.

First Embodiment

The EPS motor control apparatus in the first embodiment will be explained with referring to FIG. 3 to FIG. 5.

In a control block diagram in FIG. 3, a portion surrounded by two dot chain line in the motor control apparatus 101 corresponds to the control portion 651. The inverters 601, 602, the current sensors 701, 702, and the failure detection portions 751, 752 are not included in the control portion defined in the present disclosure. However, it should be noted that this explanation is only a conceptual separation and an arrangement of electronic element in an actual substrate is not mentioned.

When the inverters and the winding groups in all systems operate normally without any failure, that is, when there are two systems and the inverters and the winding groups in the first system and the second system operate normally, this case will be referred to as "a normal drive condition".

A configuration of the first system on behalf of all systems at the time of the normal drive condition will be explained. The control portion 651 controls energization of the motor 80 by a current feedback control with a known current vector control. The first system includes a current command value calculation portion 151, a maximum current limit portion 201, and a three-phase to two-phase converter 251, a control device 301, and a two-phase to three-phase converter 351.

The current command value calculation portion 151 calculates a dq-axis current command values Id1*, Iq1* with an expression, a map, or the like, based on a torque command trq* inputted to the current command value calculation portion 151.

The maximum current limit portion 201 limits a maximum value of a current command value from a view point such as a protection of an element against an excessive heat or the like. When the dq-axis current command values Id1*, Iq1*, which are calculated by the current command value calculation portion 151, exceed limit values, the maximum current limit portion 201 outputs dq-axis current command values Id1, Iq1, which are corrected to the limit values. When the dq-axis current command values Id1*, Iq1*, which are calculated by the current command value calculation portion 151, are equal to or less than the limit values, the maximum current limit portion 201 simply outputs the current command values Id1*, Iq1* as the current command values Id1, Iq1.

A maximum current limit value Ilim may be set to magnitude ($=\sqrt{(Id^2+Iq^2)}$) of a dq-axis current vector, or may be set to each of a d-axis current and a q-axis current. Incidentally, the maximum current limit value Ilim1 is a maximum current limit value for the first system. The maximum current limit value Ilim2 is the maximum current limit value for the second system.

The three-phase to two-phase converter 251 performs a dq conversion. The three-phase to two-phase converter 251 converts the phase current detection values Iu1, Iv1, Iw1 in the three phases detected by the current sensor 701 to the dq-axis current detection values Id1, Iq1, based on a rotation angle θ that is feed backed from the rotation angle sensor 85.

The control device 301 receives current deviation between the dq-axis current command values Id1, Iq1 and the dq-axis current detection values Id1, Iq1. In order to make the current deviation zero, the control device 301 calculates voltage command values Vd1, Vq1 by a proportional integral (PI) control calculation or the like.

The two-phase to three-phase converter 351 performs an inverse dq conversion from the dq-axis voltage command values Vd1, Vq1 to the three phase voltage values Vu1, Vv1, Vw1, based on the rotation angle θ that is feed backed from the rotation angle sensor 85.

The inverter 601 operates a switching of the MOS in each phase based on a duty signal corresponding to the three-phase voltage command values Vu1, Vv1, Vw1 with, for example, a pulse width modulation (PWM) control. Accordingly, the commanded three-phase AC voltage is applied to the motor 80, and the motor 80 generates an assist torque.

Regarding the second system, configurations of a current command value calculation portion 152, a maximum current limit portion 202, a three-phase to two-phase converter 252, a control device 302, and a two-phase to three-phase converter 352 are similar to the configuration in the first system.

Hereinafter, it is supposed that one of the inverter or the winding group of the two systems gets out of order.

In this case, it is supposed that the first system gets out of order and only the second system operates normally. Thus, in FIG. 3, a configuration used only in a failure system will be illustrated only in the first system, and a configuration used only in the normal system will be illustrated only in the second system. Incidentally, a failure detection portion 751 in the first system is illustrated with a solid line, and a failure detection portion 752 in the second system is illustrated with a broken line. It should be noted that these configurations are provided to both systems in a similar manner.

The failure supposed in the present embodiments includes a short circuit failure and an open failure.

The short circuit failure is defined as a case where, any part between wirings in the inverter 601 or the winding group 801 is conductive against a control intending a non-conductive state. Furthermore, a case where a part of the all systems has the short circuit failure is referred to as a partial system short circuit failure. Incidentally, another case where all systems get out of order and the normal system does not exist is not considered in the present disclosure.

When the short circuit failure occurs in the inverter 601, a portion between a drain and a source in either of the MOSs 611-616 in upper and lower arms in each phase is in the conductive state irrespective of receiving an off signal from the drive circuit 68 to a gate.

When the short circuit failure occurs in the winding group 801, a winding wire in either of the phases and the power source line are in a sky fault or a winding wire in either of the phases and the ground line is in a ground fault.

The open failure is defined as a case where, in the inverter 601 or the winding group 801, any part between wirings is in the non-conductive state against a control intending the conductive state. A case where a part of all systems has the open failure is referred to as a partial system open failure.

When the open failure occurs in the inverter 601, a portion between a drain and a source in either of the MOSs 611-616 in the upper and lower arms in each phase is in the non-conductive state irrespective receiving an on signal from the drive circuit 68 to the gate.

When the open failure occurs in the winding group 801, the winding wire in either of the phases, or a connection portion between the winding wire and a terminal is disconnected (in a non-connection status).

The failure detection portion 751 detects a failure of the inverter 601 or the winding group 801 based on the phase current detection values Iu1, Iv1, Iw1 detected by the current sensor 701 and the input voltage Vr1 of the inverter 601.

When the failure detection portion 751 detects a failure of the first system, the failure detection portion 751 stops an output to the inverter 601. As a manner to stop the output, as described in a broken line in the FIG. 3, the current command values Id1*, Iq1* commanded by the current command value calculation portion 151 may be set to zero, or the maximum current limit value set by the maximum current limit portion 201 may be set to zero. All drive signals from a drive circuit 58 to the MOSs 611-616 may be turned to off. When there is no possibility to re-energization, a power source relay 521 provided to the power source line of the inverter 601 on a circuit may be cut off.

The control portion 651 keeps the driving of the motor 80 only with the second system, which is in the normal drive condition. When one system gets out of order, by operating the normal system, it is possible to prevent an assist function of the steering torque from completely being lost.

It is supposed that the output to the inverter 601 in the failure system is stopped due to the short circuit failure. In this case, when the inverter 602 in the normal system drives the motor 80, or when a driver steers the steering shaft 92 and the motor 80 is rotated from a load side, a counter electromotive voltage may occur in the inverter 601 in the failure system. According to the counter electromotive voltage, a braking torque against the driving may occur in the motor 80. The braking torque may increase as the motor rotation number is greater. On the contrary, in a case of the open failure, the braking torque does not occur in the motor 80.

According to an occurrence of the braking torque at the time of the short circuit failure, the maximum torque of the motor 80 may decrease. The inventors have tried to send current to the inverter 601 in the normal system larger than current amount in the normal drive condition so as not to reduce the maximum torque or so as to prevent reduction of the maximum torque as much as possible.

In the present embodiment, the maximum current limit portion 202 in the second system, which is the normal system, obtains a motor rotation angular velocity ω. The control portion 651 makes the maximum current limit value Ilim larger as the motor rotation angular velocity ω increases.

A differentiator 86 differentiates the rotation angle θ by time, and calculates the motor rotation angle velocity ω (deg/s). The rotation angle sensor 85 detects the rotation angle ω. The motor rotation angle velocity ω may be converted into a rotation number N by multiplying a proportion coefficient. The motor rotation angular velocity ω has the identical meaning with the rotation number N.

Figure 4A:
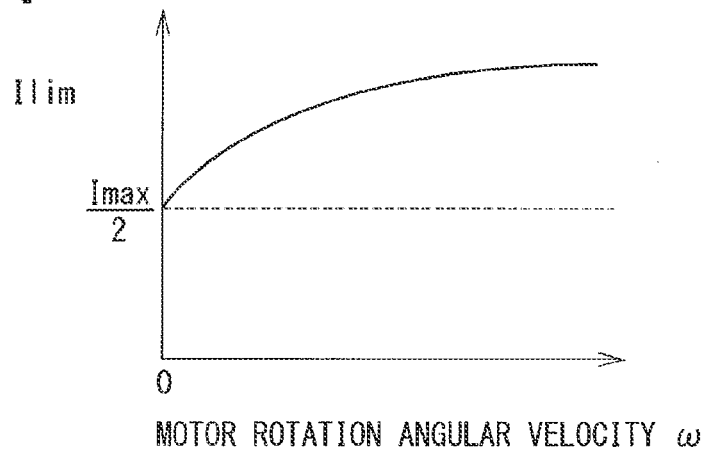
FIG. 4A is a characteristic diagram illustrating a relationship between a motor rotation angular velocity and a maximum current limit value.
Figure 4B:
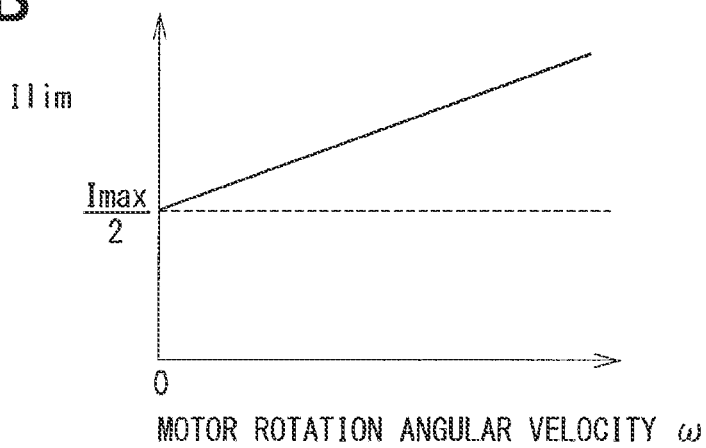
FIG. 4B is a characteristic diagram illustrating a relationship between a motor rotation angular velocity and a maximum current limit value.
Figure 4C:
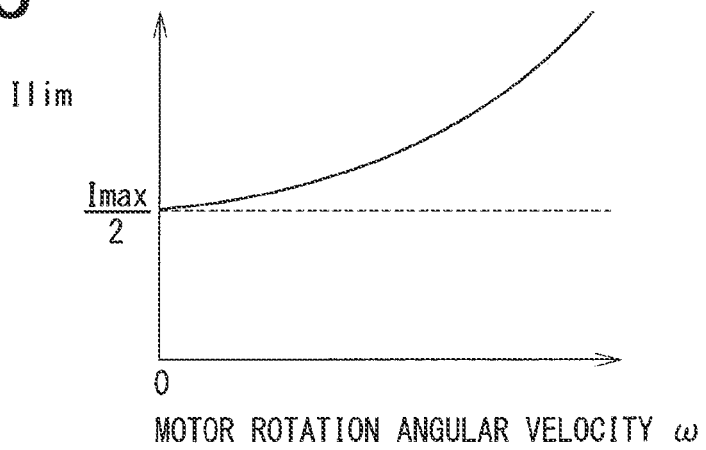
FIG. 4C is a characteristic diagram illustrating a relationship between a motor rotation angular velocity and a maximum current limit value.

FIG. 4A to FIG. 4C illustrate examples of increase characteristics of the maximum current limit value Ilim to the motor rotation angular velocity ω. A symbol of "Imax" illustrated in a vertical axis corresponds to a rated current at the time when the two systems operate normally. A half of the rated current is illustrated as "Imax/2". The symbol of "Imax/2" corresponds to a maximum current limit value per system in the normal drive condition.

In FIG. 4A to FIG. 4C, in each case, the maximum current limit value Ilim at the time (the motor rotation angular velocity ω=0) of stopping of the motor 80 is set to the half (Imax/2) of the rated current. While the motor 80 is in rotation, the maximum current limit value Ilim increases as the motor rotation angular velocity ω increases from zero. Therefore, a characteristic line with right upward is illustrated in FIG. 4A to FIG. 4C.

Incidentally, an upper limit of the motor rotation angular velocity ω in a horizontal axis in FIG. 4A to FIG. 4C illustrates a maximum angular velocity, which is assumed to be used in the electronic power steering device 1 in a practical use situation. That is, FIG. 4A to FIG. 4C correspond to the diagrams defining relationships between the motor rotation angular velocity ω and the maximum current limit value Ilim in a practical use region. It should be noted that FIG. 4A to FIG. 4C do not consider a high speed region not used actually.

The characteristic pattern in FIG. 4A has a large increase ratio of the maximum current limit value Ilim at a point where the motor rotation angular velocity ω is near zero. According to increase of the motor rotation angular velocity ω, the increase ratio of the maximum current limit value Ilim gradually decreases. The maximum current limit value Ilim is inclined to be a saturation status finally. The characteristic pattern in FIG. 4A is obtained by plotting measured values between a steering velocity and a braking torque and by generating a curve. The characteristic pattern is based on a concept that a control is performed so that the sum of the braking torque (negative) and increase amount of assist (positive) is equal to zero.

The characteristic pattern in FIG. 4B is linearly increase the maximum current limit value Ilim to the motor rotation angular velocity ω, simply.

The characteristic pattern in FIG. 4C gradually increase the increase ratio of the maximum current limit value Ilim according to an increase of the motor rotation angular velocity ω. The characteristic pattern in FIG. 4C considers adaptation by real vehicle test.

When the open failure is detected in the first system, since the braking torque by the counter electromotive voltage does not occur in the failure system, it is unnecessary to increase the maximum current limit value Ilim in the normal system. Therefore, the maximum current limit value Ilim in the normal system may be set to the maximum current limit value per system at the time of the normal drive condition, that is, Imax/2. For example, as described in the broken lines in FIG. 4A to FIG. 4C, the maximum current limit value Ilim may be set to Imax/2 irrespective of the motor ration angular velocity ω. Accordingly, the maximum current sent to one normal system is equal to the maximum current before occurrence of failure in the failure system.

A configuration routine of the maximum current limit value will be explained with referring to a flowchart in FIG. 5. It is noted that a flowchart or a processing of the flowchart in the present application includes steps (also referred to as sections), each of which is represented, for example, as S1. Further, each step may be divided into several sub-steps, and several steps may be combined into a single step.

Figure 5:
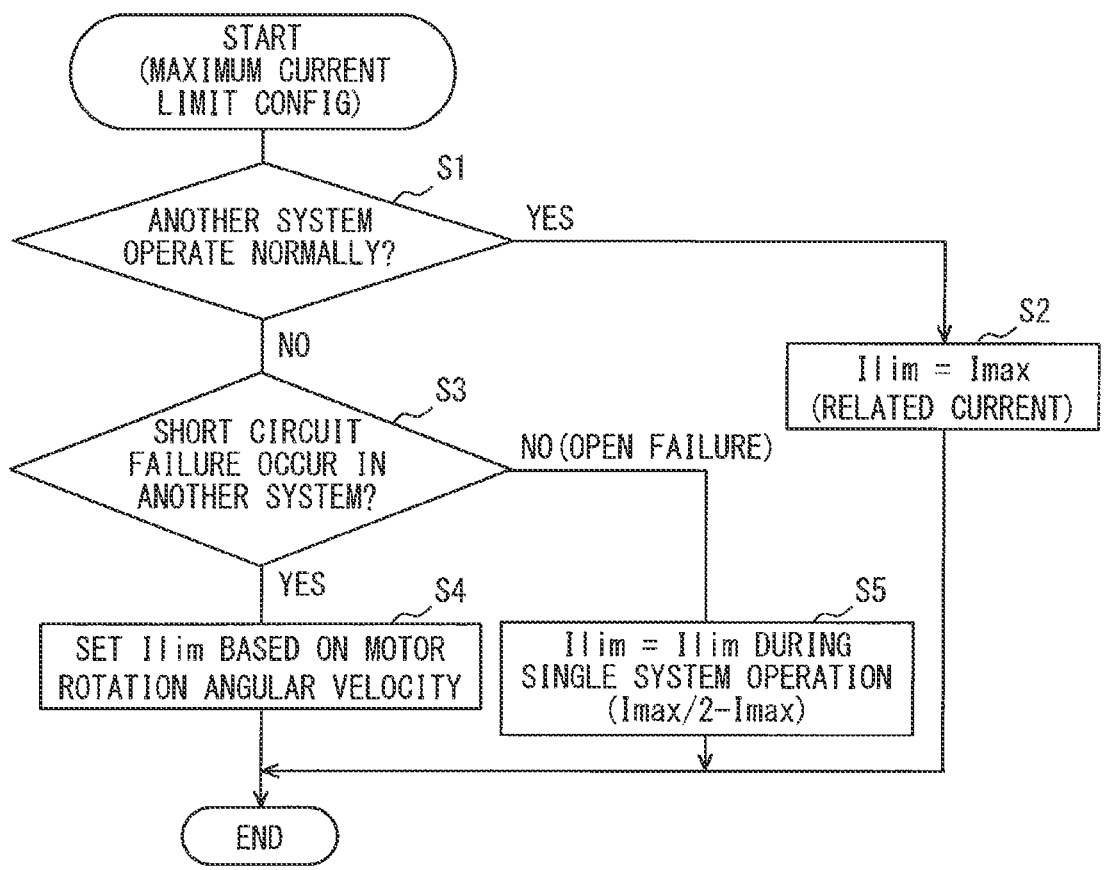
FIG. 5 is a flowchart of a configuration of a maximum current limit value in the first embodiment.

In the flowchart in FIG. 5, it is supposed that the second system operates normally, and the first system has a possibility of failure, according to the block diagram in FIG. 3. In this case, a flow setting the maximum current limit value Ilim in the second system will be explained.

At S1, it is determined whether a failure occurs in the inverter 601 or the winding group 801 in another system (in this case, the first system). When it is determined that both of the inverter 601 and the winding group 801 in another system (the first system) perform normally (S1: YES), the rated current Imax is set to the maximum current limit value Ilim at S2. When it is determined that the inverter 601 or the winding group 801 in another system (the first system) is in failure (S1: NO), it is determined at S3 whether the failure corresponds to the short circuit failure or the open failure.

When it is determined that the short circuit failure occurs (S3: YES), the maximum current limit value Ilim is set according to the motor ration angular velocity ω based on the characteristic diagram.

When it is determined that the open failure occurs (S3: NO), the maximum current limit value Ilim is set to the maximum current limit value Ilim at the time when a single system drives. The maximum current limit value Ilim at the time when a single system drives may be equal to the half (Imax/2) of the related current Imax as described in the broken line in FIG. 4A to FIG. 4C. Alternatively, by considering an output of a system, heat radiation, a safety factor, or the like, the maximum current limit value Ilim at the time when a single system drives may be set to a range from the half (Imax/2) of the related current Imax to the related current Imax.

An effect of the first embodiment will be explained.

(1) In the present embodiment, when a short circuit failure occurs in the inverter 601 or the winding group 801 in either of the two systems and the motor 80 maintains the driving only with the normal system, the maximum current limit value Ilim in the normal system increases as the motor rotation angular velocity ω is larger.

While the motor 80 is rotating, the MOSs in each phase are alternately turned on and off and current with sin waveform is sent to each phase averagely. When a resistance is expressed by R and current is expressed by I, heat generation P is expressed by the following expression: $P=R*I^2$. Therefore, an integrated value of the square of current with the sin waveform is further reduced to an integrated value of the square of a maximum current (corresponding to amplitude of the sin waveform). Since a heat generation is not concentrated on a specific phase at the time of rotating as compared with a case of stopping, the heat generation may be suppressed. By increasing the maximum current limit value Ilim only in the motor rotation, it may be possible to effectively prevent the heat generation in the normal system and to cause the motor 80 to output torque compensating for the braking torque generated by the counter electromotive voltage, which is generated in the failure system.

(2) At the time of the stopping of the motor 80, that is, at the time when the rotation angular velocity ω is equal to zero, the maximum current limit value Ilim in the normal system is equal to or less than the half (Imax/2) of the related current Imax. The related current Imax corresponds to the maximum current limit value per system in the normal drive condition.

In the stopping of the motor 80, or in a low rotation near stop, an ON period of a MOS in a specific phase may become longer as compared with a case of the high rotation. The MOS in the specific phase may intensively generate heat due to excessive current. By not increasing the maximum current limit value Ilim, it may be possible to prevent breakage or the like of an element due to excessive heat generation.

(3) When the open failure occurs in the failure system, since the breaking torque does not occur in the failure system due to the counter electromotive voltage, it may be unnecessary to increase driving force by the normal system. Therefore, irrespective of the motor rotation angular velocity ω, the maximum current limit value Ilim per system of the normal system is set to a value of the normal drive condition, so that it may be possible to simplify a control.

In a conventional art in patent literature 1, in order to prevent the failure system from excessively generating heat, an output limit value (corresponding to the maximum current limit value) Ilim in the normal system decreases as the rotation number is larger. The present disclosure considers that a required torque is outputted only by the normal system. The conventional art in patent literature 1 may focus on heat generation by counter electromotive voltage in the failure system. In the present embodiment, the maximum current limit value Ilim increases at a high rotation region. In the conventional art in patent literature 1, the output limit vale decreases, and therefore, it seems that an effect of the present embodiment is contrary to a requirement.

Figure 11:
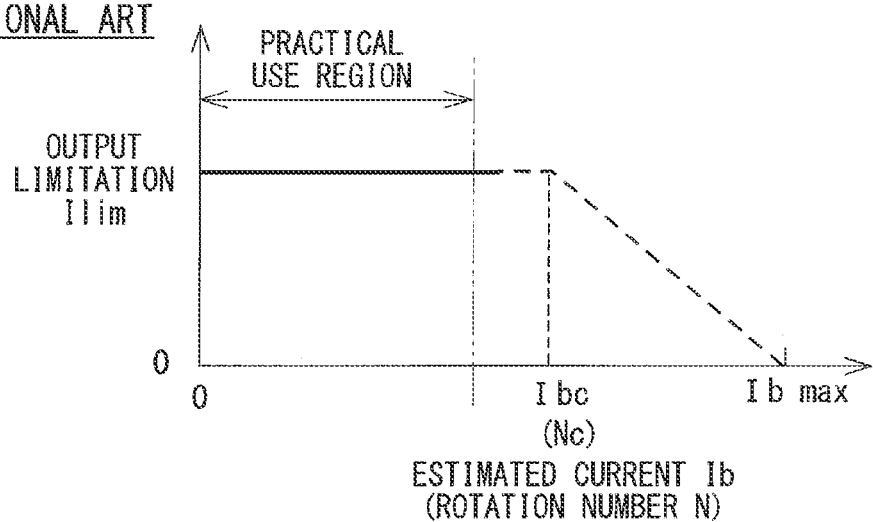
FIG. 11 is a characteristic diagram illustrating a relationship between a rotation number and an output limit value in a conventional art.

FIG. 11 illustrates a characteristic diagram corresponding to FIG. 5 (b) in patent literature 1 to illustrate a folded line of a rotation number N and the output limit value Ilim. As described in FIG. 11, the output limit value Ilim is constant in a region where the rotation number N is from zero to a boundary rotation number Nc corresponding to a current estimation value Ibc. The output limit value Ilim gradually decreases when the rotation number N exceeds the boundary rotation number Nc. This characteristic means that an influence to heat generation is relatively small according to a difference of the rotation number N in a region where the rotation number N is smaller than the boundary rotation number Nc. The value of the boundary rotation number Nc corresponding to a folded point may be largely change according to a heat resistance characteristic of an element and a winding wire and a heat radiation performance of a control apparatus.

When a practical use region of the motor 80 is included in a low rotation side of the boundary rotation number Nc, a control that the output limit value decreases in a region equal to or more than the boundary rotation number Nc may have little importance practically. In the present embodiment, it is assumed that the practical use region of the motor 80 is included in a rotation number region where the heat generation in the failure system does not have significant influence. In this condition, the maximum current control value Ilim increases in the rotation number (the motor rotation angular velocity) in the practical use region as the motor rotation angular velocity $\omega$ is greater. The motor control apparatus 101 in the present embodiment at the time of driving only with the normal system enables to output torque, which compensates the braking torque, to the motor 80 without affecting heat generation in the failure system.

Second Embodiment

A second embodiment of the present disclosure will be explained with referring to FIG. 6 to FIG. 8B.

Figure 6:
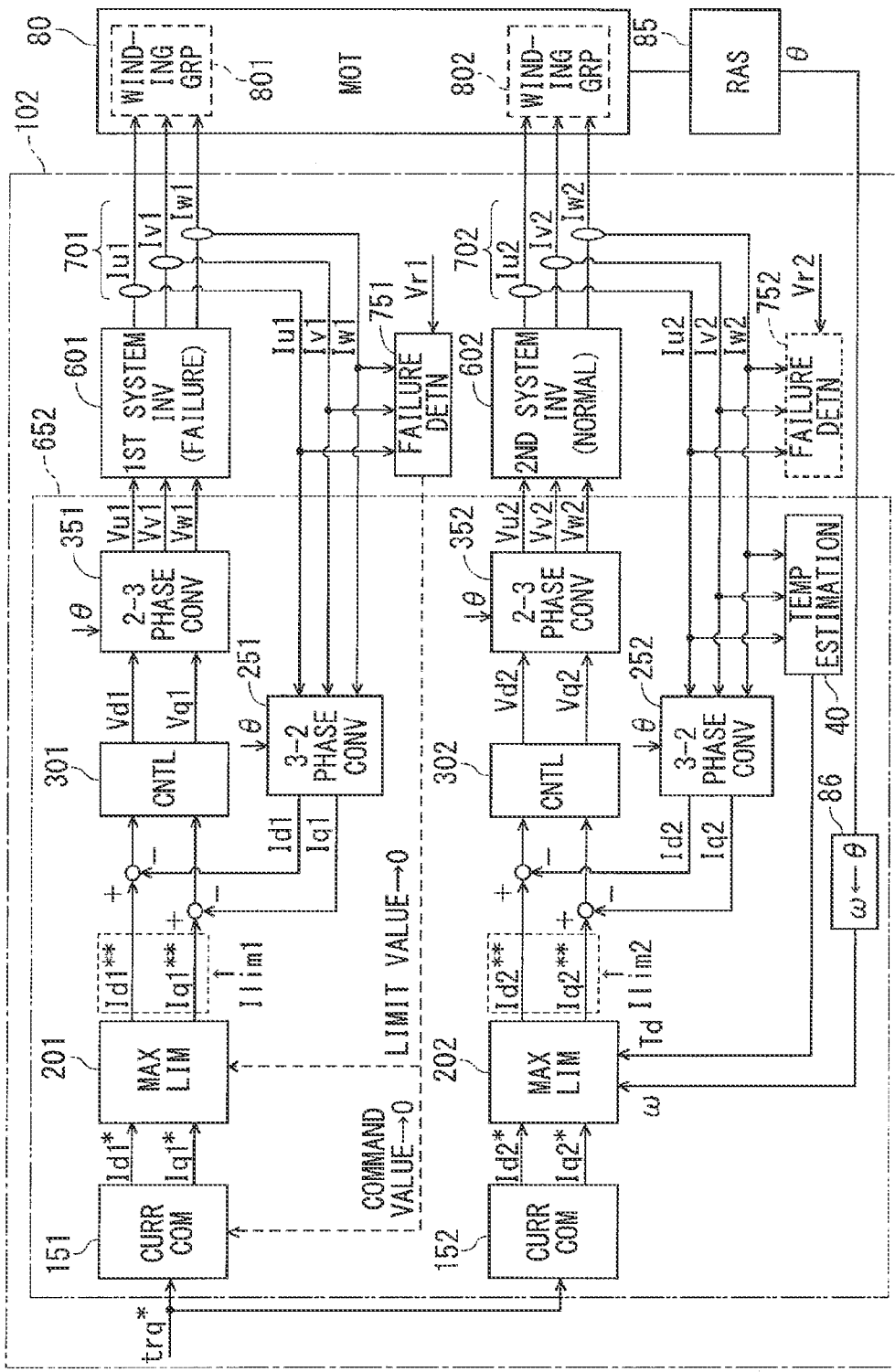
FIG. 6 is a block diagram of the EPS motor control apparatus in a second embodiment.

As described in FIG. 6, the control portion 652 in the motor control apparatus 102 in the second embodiment further includes a temperature estimation portion 40 to the first embodiment. The temperature estimation portion 40 estimates an element temperature Td in a normal system. The element temperature Td estimated by the temperature estimation portion 40 is inputted to the maximum current limit portion 20 in the second system. Incidentally, in FIG. 6, an illustration of a temperature estimation portion in the first system will be omitted.

The temperature estimation portion 40 described in FIG. 6 estimates the element temperature Td from phase currents Iu2, Iv2, Iw2. The temperature estimation portion 40 may estimate the element temperature Td based on a detection value of a temperature sensor provided to a substrate. An element temperature of the first system, which is the failure system, may also be estimated.

The maximum current limit portion 202 in the second system receives the motor rotation angular velocity $\omega$ and the element temperature Td. The rotation angle sensor 85 detects an electrical angle $\theta$. The differentiator 86 calculates the motor rotation angular velocity $\omega$ by differentiating the electrical angle $\theta$ by time. The temperature estimation portion 40 estimates the element temperature Td.

Figure 7:
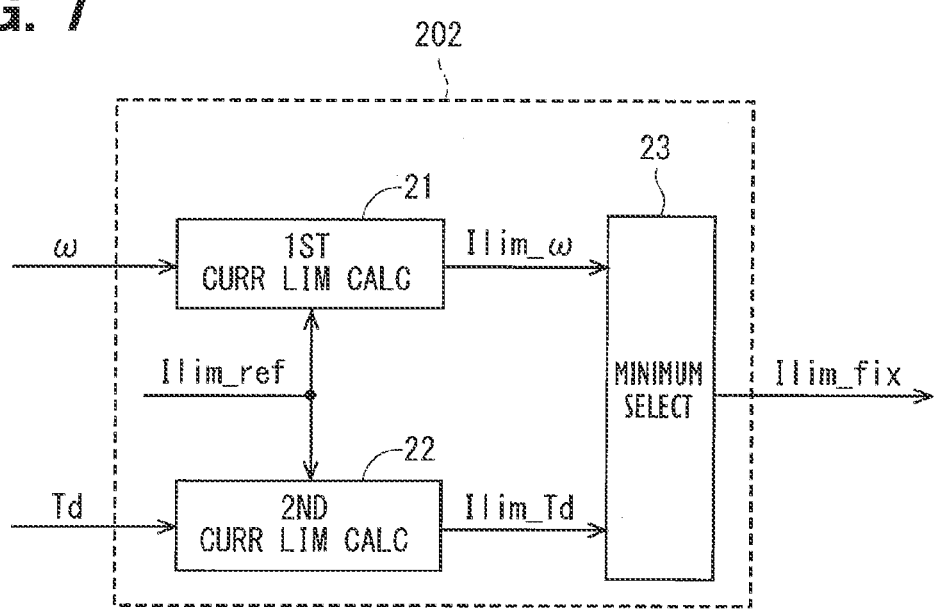
FIG. 7 is a detailed block diagram of a maximum current limit portion in FIG. 6.

As illustrated in FIG. 7, the maximum current limit portion 202 includes a first current limit calculation portion 21, a second current limit calculation portion 22, and a minimum selection portion 23. The first current limit calculation portion 21 receives the motor rotation angular velocity $\omega$. The second current limit calculation portion 22 receives the element temperature Td. The first current limit calculation portion 21 and the second current limit calculation portion 22 receive a reference value Ilim_ref, which is a reference value of the maximum current limit value. The reference value Ilim_ref is set to, for example, about half (Imax/2) of the related current Imax.

Figure 8A:
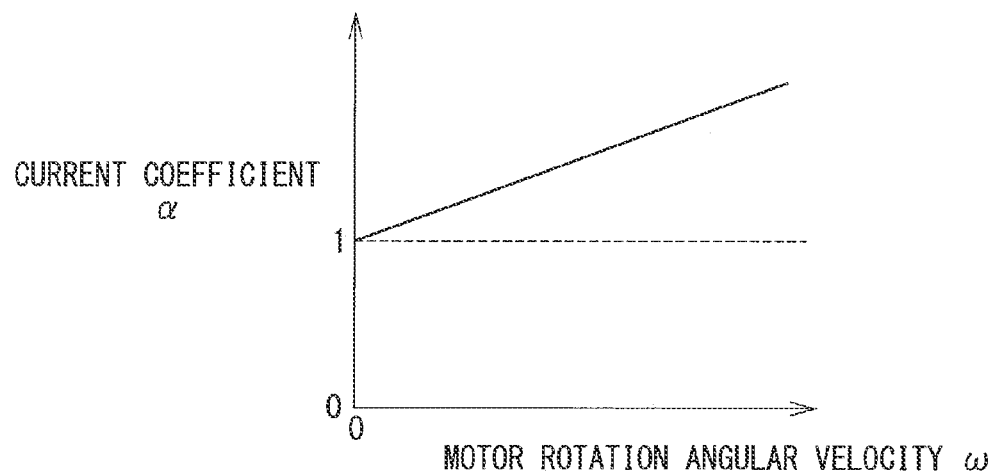
FIG. 8A is a characteristic diagram illustrating a relationship between a motor rotation angular velocity and a maximum current limit value coefficient.

The first current limit calculation portion 21 calculates a current coefficient $\alpha$ corresponding to the motor rotation angular velocity $\omega$ using a map diagram illustrated in FIG. 8A. In the map diagram, the current coefficient $\alpha$ gradually increases from one as the motor rotation angular velocity $\omega$ is larger from zero. As described in the following expression, the reference value Ilim_ref of the maximum current limit value is multiplied with the current coefficient $\alpha$, and an angular velocity current limit value Ilim_$\omega$ as a first temporary value is calculated.

The angular velocity current limit value Ilim_$\omega$ is expressed by the following expression:

$$Ilim\_\omega = Ilim\_ref \times \alpha.$$

Figure 8B:
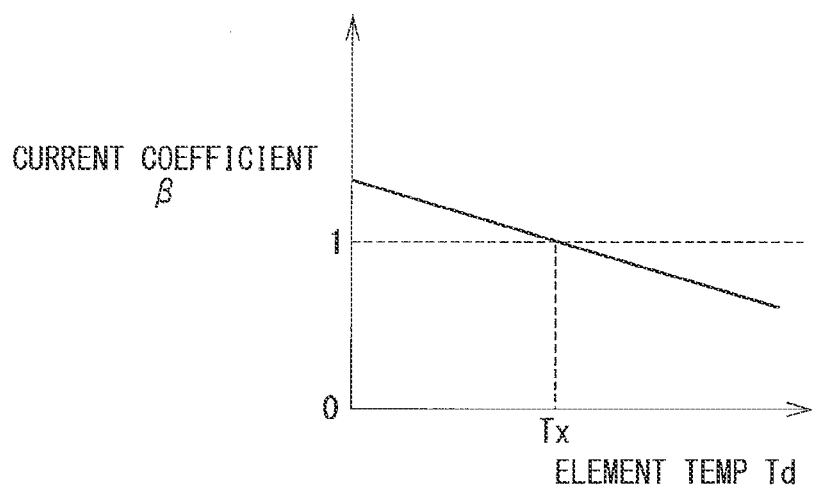
FIG. 8B is a characteristic diagram illustrating a relationship between an element temperature and a maximum current limit value coefficient.

The first current limit calculation portion 22 calculates a current coefficient $\beta$ corresponding to the element temperature Td using a map diagram illustrated in FIG. 8B. In the map diagram, the current coefficient $\beta$ decreases as the element temperature Td is higher. The current coefficient $\beta$ is set to, for example, exceed one at a temperature lower than a temperature Tx and go below one at a temperature higher than the temperature Tx. As described in the following expression, the reference value Ilim_ref of the maximum current limit value is multiplied with the current coefficient $\beta$, and an element temperature current limit value Ilim_Td as a second temporary value is calculated.

The element temperature current limit value Ilim_Td is expressed by the following expression:

$$Ilim\_td = Ilim\_ref \times \beta.$$

The diagram map calculating the current coefficients $\alpha$, $\beta$ are not limited to a linear shape as described in FIG. 8A and FIG. 8B, and may be a map diagram having a folded-line shape or a curve shape.

The minimum selection portion 23 selects a smaller value as a fix value Ilim_fix of the maximum current limit value from the angular velocity current value Ilim_$\omega$ and the element temperature current limit value Ilim_Td. The minimum selection portion 23 outputs the fix value Ilim_fix of the maximum current limit value. Accordingly, it may be possible to appropriately set the maximum current limit value Ilim according to the element temperature Td.

Therefore, the second embodiment has an additional effect in addition to effects in the first embodiment. It may be possible that the second embodiment appropriately prevents an excessive heat of an element in the normal system. Furthermore, when the element temperature in the failure system may also be estimated and the element temperature in the failure system may be reflected on a setting of the maximum current limit value Ilim, it may be possible to prevent an element in the failure system from generating heat.

Third Embodiment

A third embodiment will be explained with referring to FIG. 9. A control portion 653 in a motor control apparatus 103 in the third embodiment calculates the maximum current limit value Ilim based on a differential value (d|Ts|/dt) of an absolute value of the steering torque Ts detected by the torque sensor 94 instead of the rotation angular velocity ω. The control portion 653 calculates the maximum current limit value Ilim based on the differential value (d|Ts|/dt) of the absolute value of the steering torque Ts. The differential value (d|Ts|/dt) of the absolute value of the steering torque Ts corresponds to a variation amount within a predetermined period of time.

Figure 9:
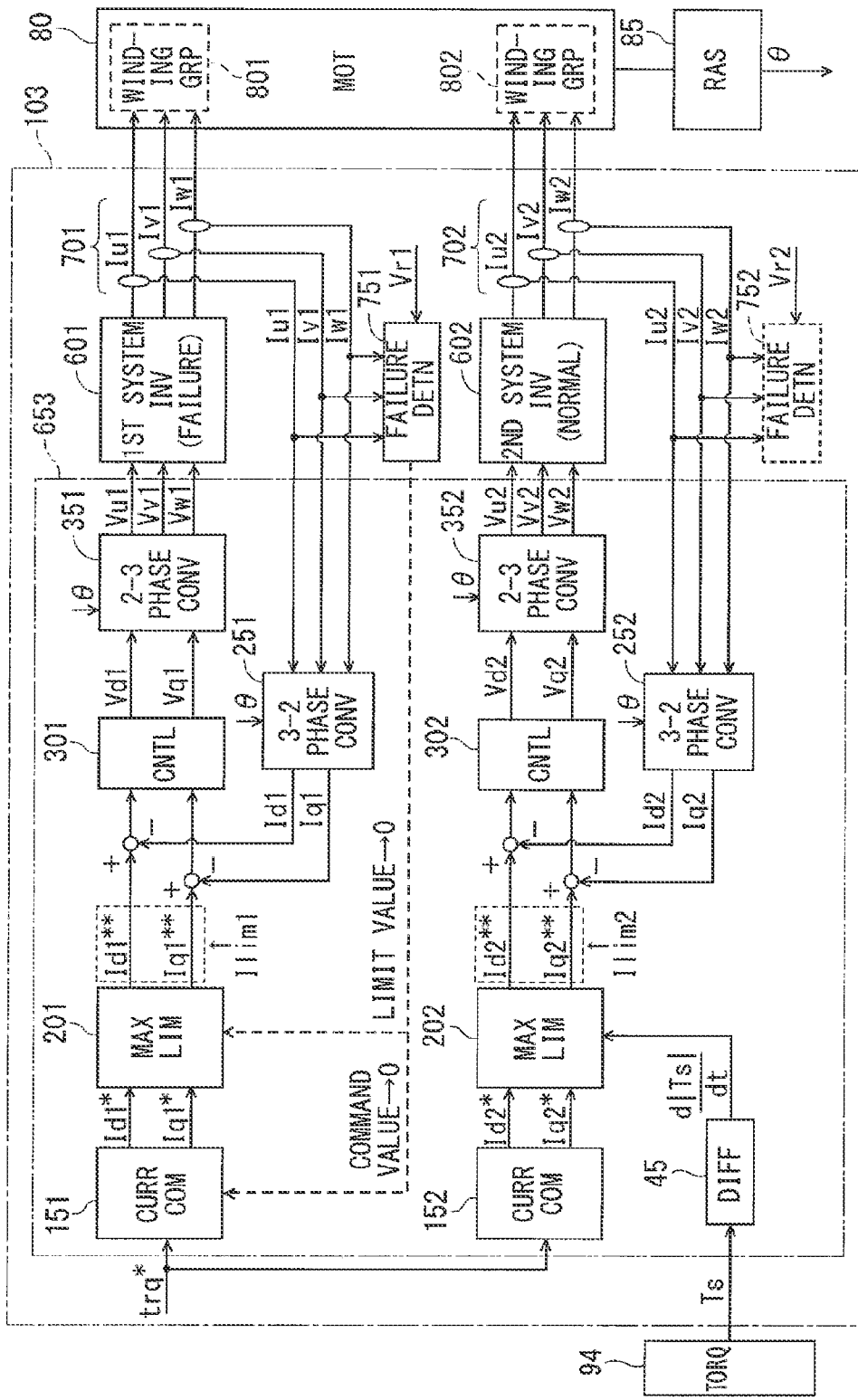
FIG. 9 is a block diagram of the EPS motor control apparatus in a third embodiment.

As described in FIG. 9, the control portion 653 obtains the steering torque Ts from the torque sensor 94. Regarding to the steering torque Ts, a first rotation direction is defined as a positive rotation, and a second rotation direction that is opposite to the first rotation direction is defined as a negative rotation. The differentiator 45 performs a time differentiation on an absolute value |Ts| of the steering torque, and outputs the differential value (d|Ts|/dt) to the maximum current limit portion 202 in the normal system.

The maximum current limit portion 202 increases the maximum current limit value Ilim as the differential value (d|Ts|/dt) of the absolute value of the steering torque Ts is larger. The increase characteristic may have each pattern similar to the increase characteristic (as described in FIG. 4A to FIG. 4C) of the maximum current limit value Ilim to the motor rotation angular velocity ω.

According to the third embodiment, when the short circuit failure occurs in the inverter 601 in the first system and a driver performs an abrupt steering with a steering wheel, in order to increase the maximum limit value Ilim in the second system, it may be possible to cause the motor 80 to output a torque for compensating the braking torque only with the driving of the second system (the normal system). Incidentally, the braking torque is generated by the counter electromotive voltage generated in the first system (the failure system).

Fourth Embodiment

Figure 10:
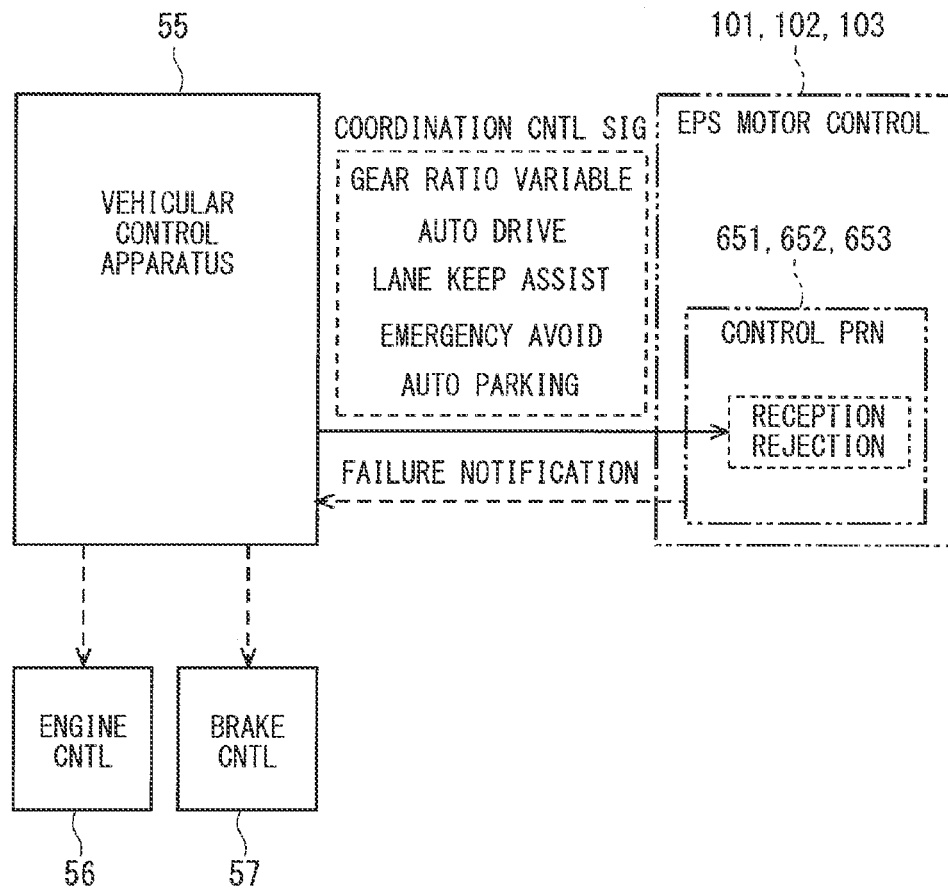
FIG. 10 is a block diagram illustrating a reception rejection of a coordination control signal from a vehicular control apparatus, in the EPS motor control apparatus in a fourth embodiment.

A fourth embodiment will be explained with referring to FIG. 10. The first embodiment to the third embodiment have a feature in the inside of the control portions 651-653. The fourth embodiment has features in the control portions 651-653 in the motor control apparatuses 101-103 and a configuration regarding communication to a vehicular control apparatus 55, which corresponds to a higher level. It should be noted that the fourth embodiment may be combined with any of the first embodiment, the second embodiment, and the third embodiment.

In a vehicle that the fourth embodiment is applied to, at the time of the normal condition, the vehicular control apparatus 55, which corresponds to the light level, commands a coordination control to the control portions 651-653 in the EPS motor control apparatuses 101-103.

Due to the coordination control, the electric power steering apparatus 1 and another control apparatus mounted to the vehicle are coordinated, so that the vehicle realizes a predetermined operation. Specifically, the coordination control corresponds to a gear ratio variable control, an automatic driving, an automatic parking, a lane keep assist, an emergency avoidance, or the like. The vehicular control apparatus 55 transmits a coordination signal to the EPS motor control apparatuses 101-103, an engine control apparatus 56, a brake control apparatus 57, or the like. Accordingly, the vehicular control apparatus 55 integrally controls an operation such as driving, turning, and stopping.

In a case where the electric power steering apparatus 1 does not operate normally, the coordination control may not perform a request of the coordination control.

In the fourth embodiment, when the failure detection portions 751, 752 detect the short circuit failure or the open failure in the inverters 601, 602 or the winding groups 801, 802 in either of the systems and, in addition, when the request of a signal of the coordination control cannot be executed, the control portions 651-653 rejects reception of the signal (also referred to as a coordination control signal) of the coordination control. The vehicular control apparatus 55 transmits the coordination control signal to the control portions 651-653.

Accordingly, when the inverters 601, 602 or the winding groups 801, 802 in either of the systems get out of order, the coordination control is performed. It may be possible to prevent an action of the vehicle against an intention of a signal of the coordination control.

Furthermore, the control portions 651-653 transmit a notification of failure or a notification of reception rejection of the coordination control signal to the vehicular control apparatus 55. The vehicular control apparatus 55 that received the notification may change or stop the coordination control signal to the engine control apparatus 56, the brake control apparatus 57, or the like as an emergency processing.

Other Embodiments

A rotary machine control apparatus in the present disclosure is not limited to a control apparatus that controls a three-phase AC motor using inverters of multiple systems. Incidentally, the inverters of the multiple phases correspond to an electric power converter. The rotary machine control apparatus may be applied to a control apparatus that controls a driving of a DC motor (a motor with brushes) using H bride circuits of the multiple systems. The H bridge circuits correspond to the electric power converter.

It should be noted that the number of phases is not limited to three, and the present disclosure may be applied to a multiple-phase AC motor having four or more phases.

The electric power converter (corresponding to the inverter or the H bride circuit) of the multiple systems is not limited to the two systems. The electric power converter (corresponding to the inverter and the H bride circuit) of the multiple systems may be three systems or more. It is supposed that one or more systems of the multiple systems get out of order and a driving is kept with one or more normal systems. In this case, it may be possible that the maximum current limit value Ilim in the normal system may be obtained by a configuration similar to the present embodiments. For example, it is supposed that there are N systems and M (<N) systems of the N systems get out of order. Incidentally, N and M are natural numbers. In this case, in the (N−M) normal systems, the maximum current limit value Ilim per system may be represented by a characteristic line that increases according to the motor rotation angular velocity ω. The maximum current limit value Ilim has a base point of the N-th part (Imax/N) of the related current according to FIG. 4A to FIG. 4C.

It should be noted that a specific configuration of the rotary machine control apparatus 10 is not limited to a configuration of the present embodiments. For example, a switching element may be a field effect transistor other than the MOSFET, IGBT, or the like. When the switching element corresponds to a transistor such as the IGBT, the short circuit failure corresponds to a case where a portion between a collector and an emitter is in an on status even when a base receives an off signal.

For example, three phase currents sent to the winding groups of the two systems are not limited to a synchronized phase. The three-phase currents may be shifted.

An application of the first embodiment in which the maximum current limit value Ilim is determined according to the motor rotation angular velocity ω or the second embodiment in which the maximum current limit value Ilim is determined according to the motor rotation angular velocity ω and the element temperature Td is not limited to the EPS motor control apparatus. The first embodiment or the second embodiment may be applied to another vehicular control apparatus other than the electric power steering apparatus, or a control apparatus of a motor or a generator in each device other than a vehicular control apparatus.

In summary, one aspect of the present disclosure relates to a control apparatus that controls a driving of a rotary machine having multiple winding groups. The control apparatus includes electric power converters, failure detection portions, and control portions in multiple systems.

The electric power converters in multiple systems include switching elements in upper and lower arms that are bridge connected. The electric power converters in multiple systems convert DC electric power and supply electric power to a corresponding winding group. For example, when the rotary machine is a multiple phase AC rotary machine, an inverter corresponds to the electric power converter. When the rotary machine is a DC rotary machine, an H bridge circuit corresponds to the electric power converter.

The failure detection portion detects a failure of the electric power converter or the winding group.

The control portion calculates a current command value with respect to current that is sent to the winding group in the rotary machine and calculates a maximum current limit value to the current command value. The control portion controls an output to the electric power converter for each system.

A condition where any part between wirings in the electric power converter or the winding group in either of the systems is conductive against a control intending a non-conductive state is referred to as a partial system short circuit failure. For example, the partial system short circuit corresponds to a case where a part between electrodes (e.g. between a drain and a source or between a collector and an emitter) is in the on status or the winding wire in the winding groups is in a sky fault or in a ground fault, even when a switching element in the electric power converter receives an off signal.

When the failure detection portion detects the partial system short circuit, the control portion stops an output to the power electric converter in a failure system. Regarding the output to the electric power converter in a normal system, the maximum current limit value increases as the rotation angular velocity in the rotary machine is larger. By increasing the maximum current limit value, it may be possible to output torque in the rotary machine. The torque compensates the braking torque generated by the counter electromotive voltage that is generated in the failure system.

Incidentally, to compensate the braking torque includes a case where a torque equal to the required torque is output by compensating all amount of reduction, and, in addition, a case where a torque nearly equal to the required torque is output by suppressing a reduction of the torque as much as possible.

Incidentally, the rotation angular velocity in the rotary machine may be replaced by a rotation number obtained by multiplying the rotation angular velocity and a proportional coefficient. The characteristic between the rotation angular velocity and the maximum current limit value specified in the present disclosure only specifies a relationship in a practical use region of the control apparatus. Therefore, it does not mean that the maximum current limit value keeps increasing to an exceeded high rotation region exceeding the practical use region in theory. The exceeded high rotation region corresponds to a rotation region that exceeds the practical use region.

In a case of a multiple-phase rotary machine, at the time of stopping of the rotary machine or at a low rotation close to the stop, the turning-on period of a switching element in a specific phase may take long time and the switching element in the specific phase may generate excessive heat intensively due to excessive current. At the time of rotation of the rotary machine, switching elements in phases alternately turn on and off, so that currents in phases are sent averagely. Therefore, the heat generation at the time of rotation is concentrated to a specific phase as compared with the stopping, and it may be possible to prevent heat generation. The maximum current limit value increases only when the rotary machine rotates. It may be possible to effectively prevent heat generation in the normal system, and to output the torque compensating the braking torque to the rotary machine.

When the rotary machine stops, that is, when the rotation angular velocity of the rotary machine is equal to zero, the maximum current limit value per system may be set to the maximum current limit value per system at the time of the normal drive condition or less. Incidentally, the normal drive condition corresponds to a case where electric power converters and winding groups in all systems operate normally. A case where the rotation angular velocity of the rotary machine is equal to zero is not limited to zero (deg/s) strictly, but includes a range substantially equal to zero (deg/s). Accordingly, it may be possible to prevent a breakage or the like of the element due to excessive heat generation in a specific phase in the normal system at the time of the stopping of the rotary machine.

The control portion may include a temperature estimation portion that estimates temperature of an electronic element configuring the control apparatus. The control portion may change the maximum current limit value according to the rotation angular velocity and the element temperature with the temperature estimation portion.

In addition, for example, in a case where the control apparatus is applied to a vehicular electric power steering apparatus and controls the driving of a motor assisting the steering torque, the control portion may increase the maximum current limit value as an variation of the steering torque within a predetermined time is larger, instead of the rotation angular velocity of the rotary machine.

Incidentally, the variation of the steering torque within the predetermined time corresponds to a differential value of an absolute value of the steering torque. It is supposed that a positive and negative directions of the steering torque are defined by a rotation direction of a steering wheel. In this case, even when the steering wheel is steered abruptly in any direction, the maximum current limit value may increase.

In addition, in the control apparatus of the rotary machine applied to the vehicular electric power steering apparatus, the control apparatus may receive a coordination control signal such as a gear ratio variable control, an automatic parking, a lane keeping assist, an emergency avoidance from a vehicular control apparatus in an upper level at the time of the normal condition. A request of the coordination control may not be performed in a case where the electric power steering apparatus is not performed normally.

When the failure detection portion detects a failure of the electric power converter or the winding group and when the rotary machine control apparatus cannot perform a request of the coordination control signal instructed from the vehicular control apparatus in the upper level, the rotary machine control apparatus may reject reception of the coordination control signal.

Incidentally, the EPS motor control apparatuses 101-103 correspond to a rotary machine control apparatus. The inverters 601, 602 correspond to an electric power converter. The motor 80 corresponds to a rotary machine.

The practical use region may be a region between 0 to 5000 rpm, for example. The output to each of the electric power converters for each of the systems may correspond to a current value, and electric power, for example.

It is noted that a flowchart or a processing of the flowchart in the present application includes steps (also referred to as sections), each of which is represented, for example, as S1. Further, each step may be divided into several sub-steps, and several steps may be combined into a single step.

While the rotary machine control apparatus has been described with reference to embodiments thereof, it is to be understood that the rotary machine control apparatus is not limited to the embodiments and constructions. The rotary machine control apparatus is intended to cover various modification and equivalent arrangements. In addition, while the various combinations and configurations, other combinations and configurations, including more, less or only a single element, are also within the spirit and scope of the present disclosure.

What is claimed is:

1. A rotary machine control apparatus controlling a drive of a rotary machine that has a plurality of winding groups, the rotary machine control apparatus comprising:
   electric power converters in a plurality of systems, wherein each of the electric power converters has a switching element in an upper arm and a switching element in a lower arm and converts DC power to supply to a corresponding winding group corresponding to each of the electric power converters, and the switching element in the upper arm is bridge connected to the switching element in the lower arm;
   a failure detection portion, using a processor, detecting a failure of an electric power converter or a winding group; and
   a control portion, using a processor, calculating a current command value, which instructs current sent to each of the winding groups in the rotary machine and a maximum current limit value to the current command value, and controlling an output to each of the electric power converters for each of the systems,
   wherein:
   a partial system short circuit failure corresponds to a case where any portion between wirings in the electric power converters or the winding groups in either of the systems is in a conductive state against a control indicating a non-conductive state; and
   when the failure detection portion detects the partial system short circuit failure in the electric power converter or the winding group in either of the systems,
   the control portion stops the output to the electric power converter in a failure system,
   the control portion increases the maximum current limit value as a rotation angular velocity of the rotary machine is larger, and
   the control portion controls the output to an electric power converter in a normal system.

2. The rotary machine control apparatus according to claim 1, wherein:
   when the failure detection portion detects the partial system short circuit failure, and when the rotation angular velocity of the rotary machine is equal to zero, the control portion sets the maximum current limit value per system to a maximum current limit value per system in a normal drive condition or less; and
   the normal drive condition corresponds to a case where the electric power converters and the winding groups in all of the systems operate normally.

3. The rotary machine control apparatus according to claim 1, wherein:
   the control portion includes a temperature estimator that estimates temperature of an electronic element in the rotary machine control apparatus; and
   when the failure detection portion detects the partial short circuit failure, the control portion changes the maximum current limit value according to the temperature of the electronic element estimated by the temperature estimator and controls the output to the electric power converter in the normal system.

4. The rotary machine control apparatus according to claim 3, wherein:
   the control portion calculates a first temporal value of the maximum current limit value according to the rotation angular velocity of the rotary machine;
   the control portion calculates a second temporal value of the maximum current limit value according to the temperature of the electronic element;
   the control portion selects a smaller value of the first temporal value and the second temporal value; and
   the control portion outputs the selected smaller value as a fixed value of the maximum current limit value.

5. The rotary machine control apparatus according to claim 1, wherein:
   a partial system open failure corresponds to a case where any portion between wirings in the electric power converters or the winding groups in either of the systems is in the non-conductive state against a control indicating the conductive state;
   when the failure detection portion detects the partial system open failure in the electric power converter or the winding group in either of the systems,
   the control portion stops the output to the electric power converter in the failure system,
   the control portion sets the maximum current limit value per system to a maximum current limit value per system in a normal drive condition or less, and
   the control portion controls the output to the electric power converter in the normal system; and
   the normal drive condition corresponds to a case where the electric power converters and the winding groups in all of the systems operate normally.

6. The rotary machine control apparatus according to claim 1, wherein:
the rotary machine control apparatus is applied to a vehicular electric power steering apparatus;
the rotary machine control apparatus controls a drive of a motor assisting a steering torque;
the rotary machine control apparatus receives a coordination control command from a vehicular control apparatus in an upper level, wherein the coordination control command realizes a predetermined operation in a vehicle by a coordination with the electric power steering apparatus and another control apparatus provided to the vehicle; and
when the failure detection portion detects the failure of the electric power converter or the winding group in either of the systems, and when the vehicular electric power steering apparatus cannot perform a request of the coordination control command received from the vehicular control apparatus, the control portion rejects reception of the coordination control command.

7. A method for controlling a drive of a rotary machine that has a plurality of winding groups and electric power converters in a plurality of systems, each of the electric power converters having a switching element in an upper arm and a switching element in a lower arm and converting DC power to supply to a corresponding winding group corresponding to each of the electric power converters, and the switching element in the upper arm being bridge connected to the switching element in the lower arm, the method comprising:
detecting a failure of an electric power converter or a winding group;
calculating a current command value, which instructs current sent to each of the winding groups in the rotary machine and a maximum current limit value to the current command value; and
controlling an output to each of the electric power converters for each of the systems, wherein a partial system short circuit failure corresponds to a case where any portion between wirings in the electric power converters or the winding groups in either of the systems is in a conductive state against a control indicating a non-conductive state; and
when the partial system short circuit failure in the electric power converter or the winding group in either of the systems is detected, the method further comprises:
stopping the output to the electric power converter in a failure system;
increasing the maximum current limit value as a rotation angular velocity of the rotary machine is larger; and
controlling the output to an electric power converter as a normal system.

8. The method according to claim 7, further comprising:
setting the maximum current limit value per system to a maximum current limit value per system in a normal drive condition or less, when the partial system short circuit failure is detected, and when the rotation angular velocity of the rotary machine is equal to zero, the normal drive condition corresponding to a case where the electric power converters and the winding groups in all of the systems operate normally.

9. The method according to claim 7, further comprising:
estimating temperature of an electronic element in the rotary machine control apparatus; and
changing the maximum current limit value according to the temperature of the electronic element and the output to the electric power converter is controlled as the normal system, when the partial short circuit failure is detected.

10. The method according to claim 9, further comprising:
calculating a first temporal value of the maximum current limit value according to the rotation angular velocity of the rotary machine;
calculating a second temporal value of the maximum current limit value according to the temperature of the electronic element;
selecting a smaller value of the first temporal value and the second temporal value; and
outputting the selected smaller value as a fixed value of the maximum current limit value.

11. The method according to claim 7, wherein
a partial system open failure corresponds to a case where any portion between wirings in the electric power converters or the winding groups in either of the systems is in the non-conductive state against a control indicating the conductive state; and
when the partial system open failure is detected in the electric power converter or the winding group in either of the systems, the method further comprises:
stopping the output to the electric power converter in the failure system,
setting the maximum current limit value per system to a maximum current limit value per system in a normal drive condition or less, and
controlling the output to the electric power converter as the normal system, wherein the normal drive condition corresponds to a case where the electric power converters and the winding groups in all of the systems operate normally.

12. The method according to claim 7, wherein
the method is applied to a vehicular electric power steering apparatus, and
the method controls a drive of a motor assisting a steering torque;
the method further comprising:
receiving a coordination control command from a vehicular control apparatus in an upper level, wherein the coordination control command realizes a predetermined operation in a vehicle by a coordination with the electric power steering apparatus and another control apparatus provided to the vehicle; and
rejecting reception of the coordination control command, when the failure of the electric power converter or the winding group in either of the systems is detected and when the vehicular electric power steering apparatus cannot perform a request of the coordination control command received from the vehicular control apparatus.

13. A system for controlling a drive of a rotary machine that has a plurality of winding groups, the system comprising:
electric power converters in a plurality of systems, wherein each of the electric power converters has a switching element in an upper arm and a switching element in a lower arm and converts DC power to supply to a corresponding winding group corresponding to each of the electric power converters, and the switching element in the upper arm is bridge connected to the switching element in the lower arm;
a central processor;
a computer-readable storage medium; and a set of computer-executable instructions stored on the computer-readable storage medium that cause the central processor to implement:
 detecting a failure of an electric power converter or a winding group;
 calculating a current command value, which instructs current sent to each of the winding groups in the rotary machine and a maximum current limit value to the current command value; and
 controlling an output to each of the electric power converters for each of the systems, wherein a partial system short circuit failure corresponds to a case where any portion between wirings in the electric power converters or the winding groups in either of the systems is in a conductive state against a control indicating a non-conductive state; and
 when the partial system short circuit failure in the electric power converter or the winding group in either of the systems is detected, the set of computer-executable instructions further comprises:
  stopping the output to the electric power converter in a failure system;
  increasing the maximum current limit value as a rotation angular velocity of the rotary machine is larger; and
  controlling the output to an electric power converter as a normal system.

14. The system according to claim 13, the set of computer-executable instructions further comprising:
 setting the maximum current limit value per system to a maximum current limit value per system in a normal drive condition or less, when the partial system short circuit failure is detected, and when the rotation angular velocity of the rotary machine is equal to zero, the normal drive condition corresponding to a case where the electric power converters and the winding groups in all of the systems operate normally.

15. The system according to claim 13, the set of computer-executable instructions further comprising:
 estimating temperature of an electronic element in the rotary machine control apparatus; and
 changing the maximum current limit value according to the temperature of the electronic element and the output to the electric power converter is controlled as the normal system, when the partial short circuit failure is detected.

16. The system according to claim 15, the set of computer-executable instructions further comprising:
 calculating a first temporal value of the maximum current limit value according to the rotation angular velocity of the rotary machine;
 calculating a second temporal value of the maximum current limit value according to the temperature of the electronic element;
 selecting a smaller value of the first temporal value and the second temporal value; and
 outputting the selected smaller value as a fixed value of the maximum current limit value.

17. The system according to claim 13, the set of computer-executable instructions further comprising:
 a partial system open failure corresponds to a case where any portion between wirings in the electric power converters or the winding groups in either of the systems is in the non-conductive state against a control indicating the conductive state; and
 when the partial system open failure is detected in the electric power converter or the winding group in either of the systems, the set of computer-executable instructions further comprises:
  stopping the output to the electric power converter in the failure system,
  setting the maximum current limit value per system to a maximum current limit value per system in a normal drive condition or less, and
  controlling the output to the electric power converter as the normal system, wherein the normal drive condition corresponds to a case where the electric power converters and the winding groups in all of the systems operate normally.

* * * * *